United States Patent
Chungbin et al.

(10) Patent No.: US 11,890,674 B2
(45) Date of Patent: Feb. 6, 2024

(54) METAL DROP EJECTING THREE-DIMENSIONAL (3D) OBJECT PRINTER AND METHOD OF OPERATION FOR FORMING SUPPORT STRUCTURES IN 3D METAL OBJECTS

(71) Applicants: Xerox Corporation, Norwalk, CT (US); Palo Alto Research Center Incorporated, Palo Alto, CA (US)

(72) Inventors: Christopher T. Chungbin, Webster, NY (US); PriyaankaDevi Guggilapu, Webster, NY (US); Daniel R. Cormier, Pittsford, NY (US); David G. Tilley, Williamson, NY (US); David A. Mantell, Rochester, NY (US); Michael F. Dapiran, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/652,988

(22) Filed: Mar. 1, 2022

(65) Prior Publication Data
US 2023/0278103 A1  Sep. 7, 2023

(51) Int. Cl.
*B33Y 30/00* (2015.01)
*B33Y 50/02* (2015.01)
(Continued)

(52) U.S. Cl.
CPC ............ *B22F 10/22* (2021.01); *B22D 23/003* (2013.01); *B22F 10/85* (2021.01); *B22F 12/50* (2021.01);
(Continued)

(58) Field of Classification Search
CPC .......... B22F 10/22; B22F 10/85; B22F 12/50; B22F 12/00; B33Y 10/00; B33Y 30/00; B33Y 40/00; B33Y 50/02; B22D 23/003
(Continued)

(56) References Cited

U.S. PATENT DOCUMENTS 6,129,872 A  10/2000  Jang
6,238,613 B1  5/2001  Batchedlder et al.
(Continued)

FOREIGN PATENT DOCUMENTS

EP  3117892 A1  1/2017
WO  2014/200595 A2  12/2014
(Continued)

OTHER PUBLICATIONS

3ders.org; New 3-way extruder and color blending nozzle developed for multi-colour/material 3D printing; 3D Printing Technology; Aug. 25, 2012; 11 Pages; www.3ders.org.
(Continued)

*Primary Examiner* — Scott R Kastler
*Assistant Examiner* — Michael Aboagye
(74) *Attorney, Agent, or Firm* — Maginot Moore & Beck LLP

(57) ABSTRACT

A metal object manufacturing apparatus is configured to eject melted metal drops to form a continuous metal line over a line of spatially separated pillars in a single pass. The ejection frequency for forming the continuous metal line is different than the frequency used to form the pillars. In one embodiment, the ejection frequency for forming the pillars is about 100 Hz and the frequency used to form the continuous metal line over the line of spatially separated pillars is about 300 Hz with a drop spacing of about 0.2 mm. Continuous metal lines are formed to extend the continuous metal lines over the pillars laterally to fill the gaps between the continuous metal lines over the pillars. These continuous metal lines that fill the gaps are formed while operating the ejection head at the 300 Hz frequency with a drop spacing of 0.28 mm.

8 Claims, 9 Drawing Sheets

(51) Int. Cl.
*B22F 10/85* (2021.01)
*B22D 23/00* (2006.01)
*B22F 10/22* (2021.01)
*B33Y 10/00* (2015.01)
*B22F 12/50* (2021.01)

(52) U.S. Cl.
CPC ............ *B33Y 10/00* (2014.12); *B33Y 30/00* (2014.12); *B33Y 50/02* (2014.12)

(58) Field of Classification Search
USPC ....... 266/236; 222/590, 591, 593; 419/2, 45, 419/47, 52, 66, 67
See application file for complete search history.

(56) References Cited

U.S. PATENT DOCUMENTS

| | | | |
|---|---|---|---|
| 6,593,053 B1 | 7/2003 | Chang et al. | |
| 6,773,249 B1 | 8/2004 | Przytulla et al. | |
| 7,604,470 B2 | 10/2009 | LaBossiere et al. | |
| 7,765,949 B2 | 8/2010 | Fork et al. | |
| 8,801,415 B2 | 8/2014 | Khoshnevis | |
| 8,827,684 B1 | 9/2014 | Schumacher et al. | |
| 9,757,900 B2 | 9/2017 | Nystrom et al. | |
| 9,993,964 B2 | 6/2018 | Mantell | |
| 10,029,415 B2* | 7/2018 | Swanson | B29C 64/209 |
| 11,235,382 B2* | 2/2022 | Mantell | B22F 3/24 |
| 11,358,215 B2* | 6/2022 | Atwood | B22F 10/22 |
| 2004/0141018 A1 | 7/2004 | Silverbrook | |
| 2004/0164436 A1 | 8/2004 | Khoshnevis | |
| 2004/0253365 A1 | 12/2004 | Warren et al. | |
| 2014/0039659 A1 | 2/2014 | Boyer et al. | |
| 2014/0048969 A1 | 2/2014 | Swanson et al. | |
| 2014/0121813 A1 | 5/2014 | Schmehl | |
| 2014/0242208 A1 | 8/2014 | Esworthy | |
| 2014/0291886 A1 | 10/2014 | Mark et al. | |
| 2014/0328964 A1 | 11/2014 | Mark et al. | |
| 2014/0363532 A1 | 12/2014 | Wolfgram | |
| 2014/0368568 A1 | 12/2014 | Kodama et al. | |
| 2015/0035198 A1 | 2/2015 | Saba | |
| 2015/0056432 A1 | 2/2015 | Solberg | |
| 2015/0077215 A1 | 3/2015 | Ranky et al. | |
| 2015/0093468 A1 | 4/2015 | Page | |
| 2016/0136897 A1 | 5/2016 | Nielsen-Cole et al. | |
| 2016/0325498 A1 | 11/2016 | Gelbert | |
| 2016/0346997 A1 | 12/2016 | Lewis et al. | |
| 2017/0157828 A1 | 6/2017 | Mandel et al. | |
| 2017/0157831 A1 | 6/2017 | Mandel et al. | |
| 2017/0157843 A1 | 6/2017 | Nystrom et al. | |
| 2017/0157844 A1 | 6/2017 | Mandel et al. | |
| 2017/0334137 A1 | 11/2017 | Nystrom et al. | |
| 2018/0111306 A1 | 4/2018 | Mandel et al. | |
| 2018/0111308 A1 | 4/2018 | Mantell et al. | |
| 2018/0111336 A1 | 4/2018 | Mantell et al. | |
| 2021/0121947 A1 | 4/2021 | Mantell et al. | |
| 2022/0219238 A1* | 7/2022 | LeFevre | B41J 2/04 |
| 2022/0241866 A1* | 8/2022 | Elliot | B22F 10/22 |

FOREIGN PATENT DOCUMENTS

| | | |
|---|---|---|
| WO | 2015027938 A1 | 3/2015 |
| WO | 2015077262 A1 | 5/2015 |

OTHER PUBLICATIONS

Sure Tack Systems; Automatic Adhesive Applicator Equipment; Brochure; 2018; 3 Pages; https://suretacksystems.com/products/automatic-applicators/.

Francis X. Govers III; Diamond Hotend makes multi-color 3D printing possible from a single nozzle; Gizmag; Apr. 12, 2015; 6 Pages; www.gizmag.com.

Sure Tack Systems; HA2 Series Extrusion Hot Melt Applicator, Brochure; 2018; 4 Pages; https://suretacksystems.com/extrusion.

Nscrypt, Inc.; World-wide Leader in Micro to Pico-liter Dispensing Systems with our Patented Micro Dispense Pump; nScrypt, Inc.; 2001-2012; 3 Pages; www.nscrypt.com.

e3d-online.com; Multi-Extrusion; E3D-Online; 2014; 6 Pages; www.e3d-online.com/Multi-Extrusion.

Simplify 3D; Printing with Multiple Extruders; Jul. 23, 2015; 5 Pages; www.simplify3d.com/support/tutorials.

Isaac Budmen; Understanding Shells, Layer Height and Infill; Team Budmen; Sep. 2013; 1 Page; www.blog.teambudmen.com.

* cited by examiner

METAL DROP EJECTING THREE-DIMENSIONAL (3D) OBJECT PRINTER AND METHOD OF OPERATION FOR FORMING SUPPORT STRUCTURES IN 3D METAL OBJECTS

TECHNICAL FIELD

This disclosure is directed to three-dimensional (3D) object printers that eject melted metal drops to form objects and, more particularly, to the formation of bridging layers with the ejected metal used to form objects in such printers.

BACKGROUND

Three-dimensional printing, also known as additive manufacturing, is a process of making a three-dimensional solid object from a digital model of virtually any shape. Many three-dimensional printing technologies use an additive process in which an additive manufacturing device ejects drops or extrudes ribbons of a build material to form successive layers of the part on top of previously deposited layers. Some of these technologies use ejectors that eject UV-curable materials, such as photopolymers or elastomers, while others melt plastic materials to produce thermoplastic material that is extruded to form successive layers of thermoplastic material. These technologies are used to construct three-dimensional objects with a variety of shapes and features. This additive manufacturing method is distinguishable from traditional object-forming techniques, which mostly rely on the removal of material from a work piece by a subtractive process, such as cutting or drilling.

Recently, some 3D object printers have been developed that eject drops of melted metal from one or more ejectors to form 3D metal objects. These printers have a source of solid metal, such as a roll of wire, macro-sized pellets, or metal powder, and the solid metal is fed into a heated receptacle of a vessel in the printer where the solid metal is melted and the melted metal fills the receptacle. The receptacle is made of non-conductive material around which an electrical wire is wrapped to form a coil. An electrical current is passed through the coil to produce an electromagnetic field that causes a drop of melted metal at the nozzle of the receptacle to separate from the melted metal within the receptacle and be propelled from the nozzle. A platform is configured to move in a X-Y plane parallel to the plane of the platform by a controller operating actuators so melted metal drops ejected from the nozzle form metal layers of an object on the platform. The controller operates another actuator to alter the position of the ejector or platform to maintain a constant distance between the ejector and an existing layer of the metal object being formed. This type of metal drop ejecting printer is called a magnetohydrodynamic (MHD) printer.

In the 3D object printing systems that use elastomer materials, temporary support structures are formed by using an additional ejector to eject drops of a different material to form supports for overhang and other object features that extend away from the object during formation of the object. Because these support structures are made from materials that are different than the materials that form the object they can be designed not to adhere or bond well with the object. Consequently, they can be easily separated from the object feature that they supported during object manufacture and removed from the object after object formation is finished. Such is not the case with metal drop ejecting systems. If the melted metal used to form objects with the printer is also used to form support structures, then the support structure bonds strongly with the features of the object that need support while they solidify. Consequently, a significant amount of cutting, machining, and polishing is needed to remove the supports from the object after manufacture of the object is complete.

To address the strong bonding of metal support layers to metal objects, the metal supports are formed by building support walls topped with pillars on which the object layers are formed. As used in this document, the term "pillars" means an accumulation of metal drops that extend vertically from a base and that are surrounded on all lateral sides by vacant space. Thus, a group of pillars is a plurality of pillars spatially separated from one another. Because the top surfaces of the pillars are smaller than a continuous wall and spaces are interspersed between the pillars, the pillars can be broken away from the object layer supported by the pillars more easily than solid structure walls. While this type of support structure is an improvement over solid support walls, they are time consuming to build due to thermal constraints. After solid support foundation walls have been formed, the pillars are formed on the tops of the walls. Then to form the first layer of the object supported by the pillars, the ejector is moved along a line of pillars on a wall to eject melted drops that contact and extend the tops of the pillars once they freeze. This process is repeated to continue the extension of the pillar tops until the pillar tops are connected to one another. The ejector head is then moved laterally and, as the ejector head moves parallel to the line of connected pillars, melted metal drops are ejected at intervals so the drops contact the line of connected pillar tops and extend the line of connected pillars laterally as they freeze. These lateral extensions must be separated from one another to ensure the drops adequately solidify. If the drops are ejected too close to one another, then the heat of the adjacent drops slows the freeze rate of the drops and the lateral extension droops. This multiple pass process to connect the pillars and then extend them laterally to form a metal layer is time consuming but is required since continuous firing of the ejector in an effort to join the pillars and extend them does not permit the melted metal drops to solidify sufficiently to form the object layer. Being able to form metal support structures quickly that have adequate strength for supporting a metal layer would be beneficial.

SUMMARY

A new method of operating a metal drop ejecting apparatus forms support structures quickly that have adequate strength for supporting a metal layer. The method includes operating an ejector head to eject melted metal drops through a nozzle to form a first line of spatially separated pillars, and operating the ejector head to eject melted metal drops to form a continuous metal line over the first line of spatially separated pillars in a single pass of the ejector head over the first line of spatially separated pillars.

A new metal drop ejecting apparatus forms support structures quickly that have adequate strength for supporting a metal layer. The new 3D metal object printer includes an ejector head configured to eject melted metal drops through a nozzle, a planar member positioned to receive melted metal drops ejected from the ejector head, and a controller operatively connected to the ejector head. The controller is configured to operate the ejector head to eject melted metal drops to form a continuous metal line over a first line of spatially separated pillars in a single pass of the ejector head over the first line of spatially separated pillars.

BRIEF DESCRIPTION OF THE DRAWINGS

The foregoing aspects and other features of a method that forms support structures quickly that have adequate strength for supporting a metal layer and a 3D metal object printer that implements the method are explained in the following description, taken in connection with the accompanying drawings.

DETAILED DESCRIPTION

Figure 1:
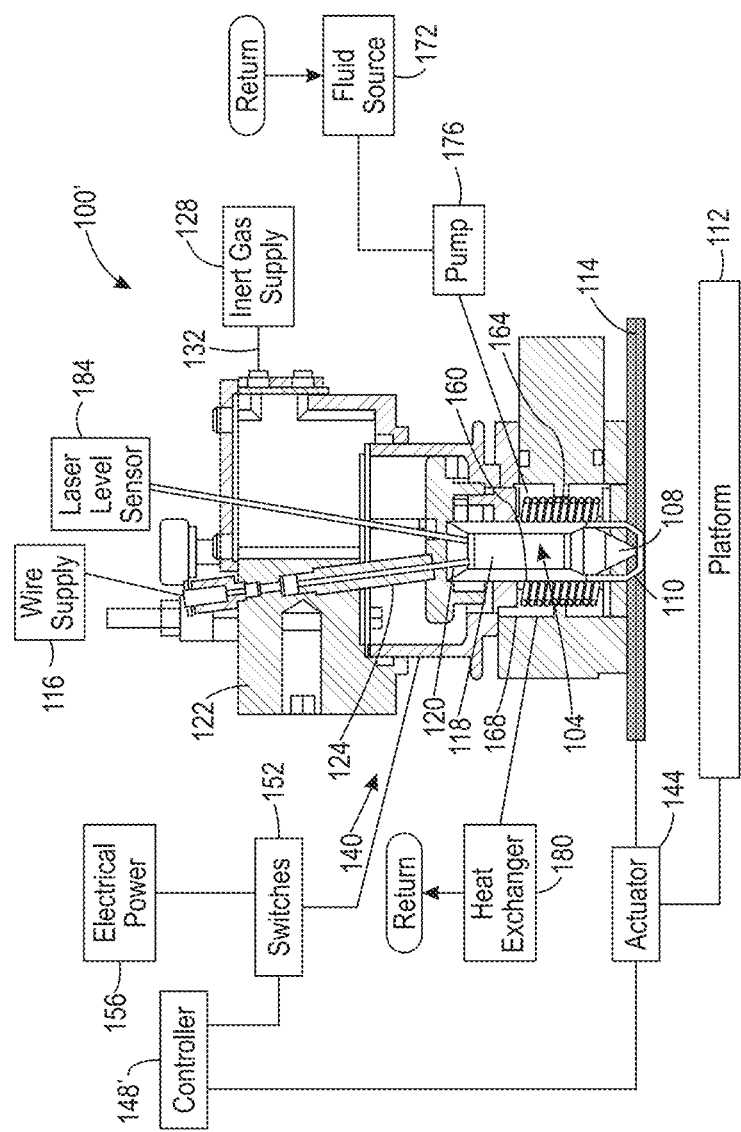
FIG. 1 depicts a new 3D metal object printer that forms support structures more quickly than the printer shown in FIG. 5 and that have adequate strength for supporting a metal layer.

For a general understanding of the 3D metal object printer and its operation as disclosed herein as well as the details for the printer and its operation, reference is made to the drawings. In the drawings, like reference numerals designate like elements.

Figure 5:
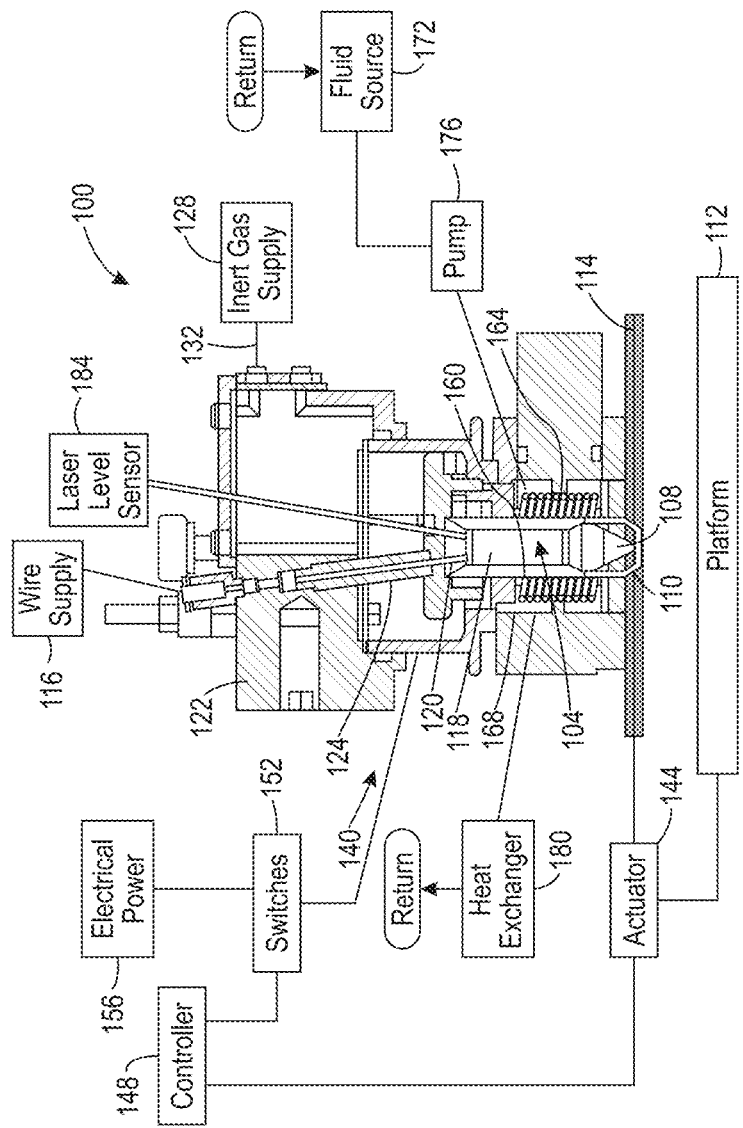
FIG. 5 depicts a prior art 3D metal object printer that forms support structures using a multiple pass process for joining pillars formed on a foundational wall.

FIG. 5 illustrates an embodiment of a previously known 3D metal object printer 100 that forms metal support structures less efficiently than the printer shown in FIG. 1. As used in this document, the term "support structures" means formations of metal made with melted metal drops ejected from an ejector head that are later removed from a part formed with other melted metal drops ejected from the ejector head. As used in this document, the term "part" means an object of manufacture made with a 3D metal drop ejecting apparatus. In the printer of FIG. 5, drops of melted bulk metal are ejected from a receptacle of a removable vessel 104 having a single nozzle 108 to form layers of the manufactured object on a build platform 112. As used in this document, the term "removable vessel" means a hollow container having a receptacle configured to hold a liquid or solid substance and the container as a whole is configured for installation and removal in a 3D metal object printer. As used in this document, the term "vessel" means a hollow container having a receptacle configured to hold a liquid or solid substance that may be configured for installation and removal from a 3D object metal printer. As used in this document, the term "bulk metal" means conductive metal available in aggregate form, such as wire of a commonly available gauge, macro-sized metal pellets, and metal powder.

With further reference to FIG. 5, a source of bulk metal 116, such as metal wire 120, is fed into a wire guide 124 that extends through the upper housing 122 in the ejector head 140 and melted in the receptacle of the removable vessel 104 to provide melted metal for ejection from the nozzle 108 through an orifice 110 in a baseplate 114 of the ejector head 140. As used in this document, the term "nozzle" means an orifice fluidically connected to a volume within a receptacle of a vessel containing melted metal that is configured for the expulsion of melted metal drops from the receptacle within the vessel. As used in this document, the term "ejector head" means the housing and components of a 3D metal object printer that melt, eject, and regulate the ejection of melted metal drops for the production of metal objects. A melted metal level sensor 184 includes a laser and a reflective sensor. The reflection of the laser off the melted metal level is detected by the reflective sensor, which generates a signal indicative of the distance to the melted metal level. The controller receives this signal and determines the level of the volume of melted metal in the removable vessel 104 so it can be maintained at an appropriate level 118 in the receptacle of the removable vessel. The removable vessel 104 slides into the heater 160 so the inside diameter of the heater contacts the removable vessel and can heat solid metal within the receptacle of the removable vessel to a temperature sufficient to melt the solid metal. As used in this document, the term "solid metal" means a metal as defined by the periodic chart of elements or alloys formed with these metals in solid rather than liquid or gaseous form. The heater is separated from the removable vessel to form a volume between the heater and the removable vessel 104. An inert gas supply 128 provides a pressure regulated source of an inert gas, such as argon, to the ejector head through a gas supply tube 132. The gas flows through the volume between the heater and the removable vessel and exits the ejector head around the nozzle 108 and the orifice 110 in the baseplate 114. This flow of inert gas proximate to the nozzle insulates the ejected drops of melted metal from the ambient air at the baseplate 114 to prevent the formation of metal oxide during the flight of the ejected drops. A gap between the nozzle and the surface on which an ejected metal drop lands is intentionally kept small enough that the inert gas exiting around the nozzle does not dissipate before the drop within this inert gas flow lands.

The ejector head 140 is movably mounted within Z-axis tracks for movement of the ejector head with respect to the platform 112. One or more actuators 144 are operatively connected to the ejector head 140 to move the ejector head along a Z-axis and are operatively connected to the platform 112 to move the platform in an X-Y plane beneath the ejector head 140. The actuators 144 are operated by a controller 148 to maintain an appropriate distance between the orifice 110 in the baseplate 114 of the ejector head 140 and a surface of an object on the platform 112.

Moving the platform 112 in the X-Y plane as drops of molten metal are ejected toward the platform 112 forms a swath of melted metal drops on the object being formed. Controller 148 also operates actuators 144 to adjust the distance between the ejector head 140 and the most recently formed layer on the substrate to facilitate formation of other structures on the object. While the molten metal 3D object printer 100 is depicted in FIG. 5 as being operated in a vertical orientation, other alternative orientations can be employed. Also, while the embodiment shown in FIG. 5 has a platform that moves in an X-Y plane and the ejector head moves along the Z axis, other arrangements are possible. For example, the actuators 144 can be configured to move the ejector head 140 in the X-Y plane and along the Z axis or they can be configured to move the platform 112 in both the X-Y plane and Z-axis.

A controller 148 operates the switches 152. One switch 152 can be selectively operated by the controller to provide electrical power from source 156 to the heater 160, while another switch 152 can be selectively operated by the controller to provide electrical power from another electrical source 156 to the coil 164 for generation of the electrical field that ejects a drop from the nozzle 108. Because the heater 160 generates a great deal of heat at high temperatures, the coil 164 is positioned within a chamber 168 formed by one (circular) or more walls (rectilinear shapes) of the ejector head 140. As used in this document, the term "chamber" means a volume contained within one or more walls within a metal drop ejecting printer in which a heater, a coil, and a removable vessel of a 3D metal object printer are located. The removable vessel 104 and the heater 160 are located within such a chamber. The chamber is fluidically connected to a fluid source 172 through a pump 176 and also fluidically connected to a heat exchanger 180. As used in this document, the term "fluid source" refers to a container of a liquid having properties useful for absorbing heat. The heat exchanger 180 is connected through a return to the fluid source 172. Fluid from the source 172 flows through the chamber to absorb heat from the coil 164 and the fluid carries the absorbed heat through the exchanger 180, where the heat is removed by known methods. The cooled fluid is returned to the fluid source 172 for further use in maintaining the temperature of the coil in an appropriate operational range.

The controller 148 of the 3D metal object printer 100 requires data from external sources to control the printer for metal object manufacture. In general, a three-dimensional model or other digital data model of the object to be formed is stored in a memory operatively connected to the controller 148. The controller can selectively access the digital data model through a server or the like, a remote database in which the digital data model is stored, or a computer-readable medium in which the digital data model is stored. This three-dimensional model or other digital data model is processed by a slicer implemented with a controller to generate machine-ready instructions for execution by the controller 148 in a known manner to operate the components of the printer 100 and form the metal object corresponding to the model. The generation of the machine-ready instructions can include the production of intermediate models, such as when a CAD model of the device is converted into an STL data model, a polygonal mesh, or other intermediate representation, which in turn can be processed to generate machine instructions, such as g-code, for fabrication of the object by the printer. As used in this document, the term "machine-ready instructions" means computer language commands that are executed by a computer, microprocessor, or controller to operate components of a 3D metal object additive manufacturing system to form metal objects on the platform 112. The controller 148 executes the machine-ready instructions to control the ejection of the melted metal drops from the nozzle 108, the positioning of the platform 112, as well as maintaining the distance between the orifice 110 and a surface of the object on the platform 112.

Using like reference numbers for like components and removing some of the components not used to form metal support structures, a new 3D metal object printer 100' is shown in FIG. 1. The printer 100' includes a controller 148', which is configured with programmed instructions stored in a non-transitory memory connected to the controller, that cause the controller 148' to operate the ejector of the printer to form continuous lines of metal to join the tops of pillars formed on support foundational walls and to form continuous lines of metal that join the continuous metal lines formed over the pillars.

Figure 2A:
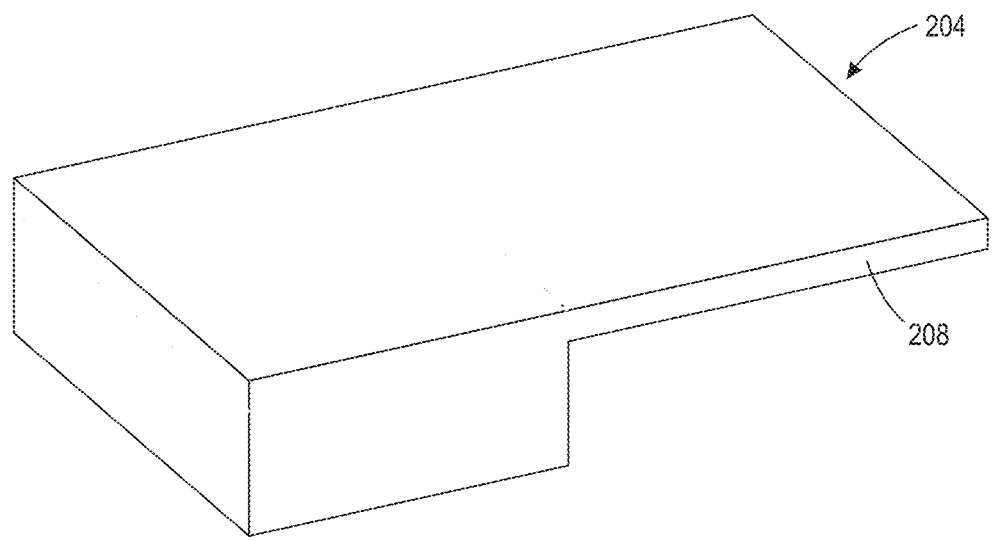
FIG. 2A is a perspective view of a metal object after completion of its manufacture with all support structures removed.
Figure 2B:
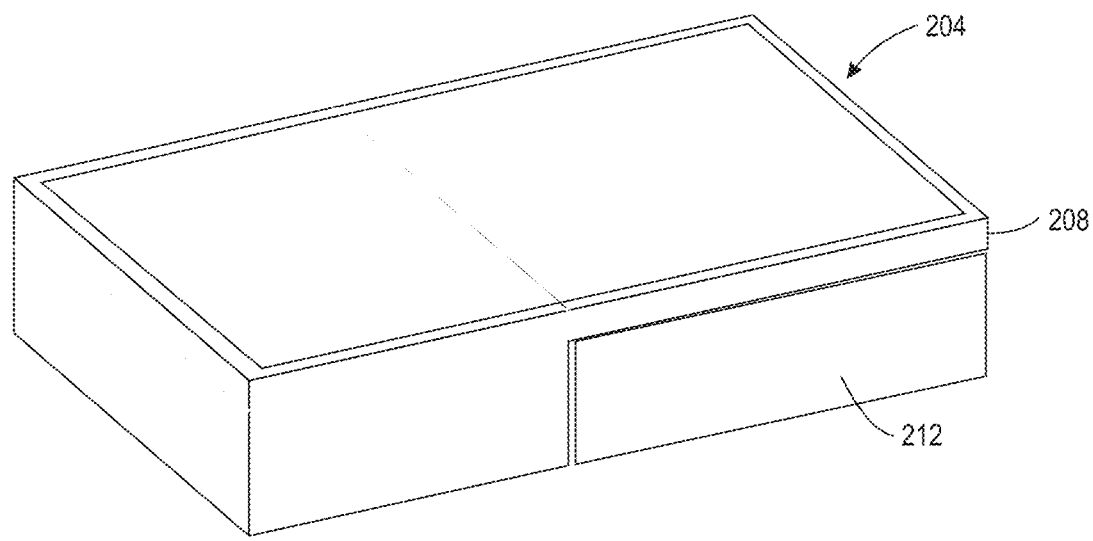
FIG. 2B is a perspective view of a metal object after completion of its manufacture with the support structure still present that enables formation of an overhang of the object.

A 3D metal object 204 manufactured by the printer 100' after removal of the support structure for the overhang 208 is shown in FIG. 2A. The volume underneath the overhang 208 cannot support the formation of the overhang unless it is filled with a support structure. The object 204 with the support structure 212 is shown in FIG. 2B.

The construction of the previously known support structures require the building of a front wall, a rear wall, and foundational walls having pillars formed on top of them that extend between the front wall and rear wall. The walls are typically formed with several drops adjacent to one another in the X and Y directions to provide an adequate base for the weight bearing to be endured by the structure. Additional drops are ejected onto the bases of the walls to build the walls to a predetermined height in a known manner. This known manner requires the building of the walls to be conducted with multiple passes around the perimeter of the support structure with the drops forming the bases of the wall being ejected at spaced intervals. The interval between drops in a pass is sufficient to distance the drops from one another so the drops in the same pass do not land on each other. Each subsequent pass ejects melted metal drops into spaces between previously ejected drops. The final few passes eject drops onto previously ejected drops to complete the base for a foundational wall. This procedure continues for building each layer of the foundational walls. The melted metal drops that form the foundational walls are ejected at a frequency of about 100 Hz with a drop spacing of about 0.28 mm. This frequency and drop spacing ensures that the drops are able to freeze and that the thermal load of the landed melted metal drops does not adversely impact the formation of the bases of the walls or the building of the solid metal walls.

In this same known method, pillars are built on top of the front wall, the back wall, and the foundational walls. That is, multiple passes of the ejector head 140 are used to form the bases for the pillars on the front wall, the back wall, and the foundational walls at a predetermined interval from one another and then subsequent passes eject one or more drops in multiple passes onto the solidified drops previously ejected for each pillar to extend each pillar above the wall.

In previously known printers, such as the one shown in FIG. 5, the pillars on the same wall are joined to one another with a line of metal drops. The line of metal drops is formed by ejecting a melted metal drop for each pillar that slightly overhangs the pillar so when it freezes it extends the top of the pillar in the direction of the next pillar. Subsequent passes eject a melted metal drop that slightly overhangs the previously ejected metal drop to extend the pillar further toward the next pillar. The passes continue until the pillars are joined to one another at their tops to form a continuous metal line over the pillars for each wall. The top layer of the support structure is formed by ejecting melted metal drops that slightly overhang the metal line connecting the pillar tops in a direction that extends one continuous metal line covering the pillars on one wall toward a continuous metal line covering the pillars on a next wall. Multiple passes are required to extend one continuous metal line toward another continuous metal line by one drop width at a time. This process is repeated until two continuous metal lines covering two separate groups of pillars on different walls have a layer that extends between them. In this manner, all of the continuous metal lines over the pillars on each wall are joined to one another to form the upper surface of the supporting structure. This previously known process for operating a 3D metal object printer to form a supporting structure is time consuming but is necessary to avoid adverse thermal impacts of melted metal drops landing too close to one another.

Figure 3A:
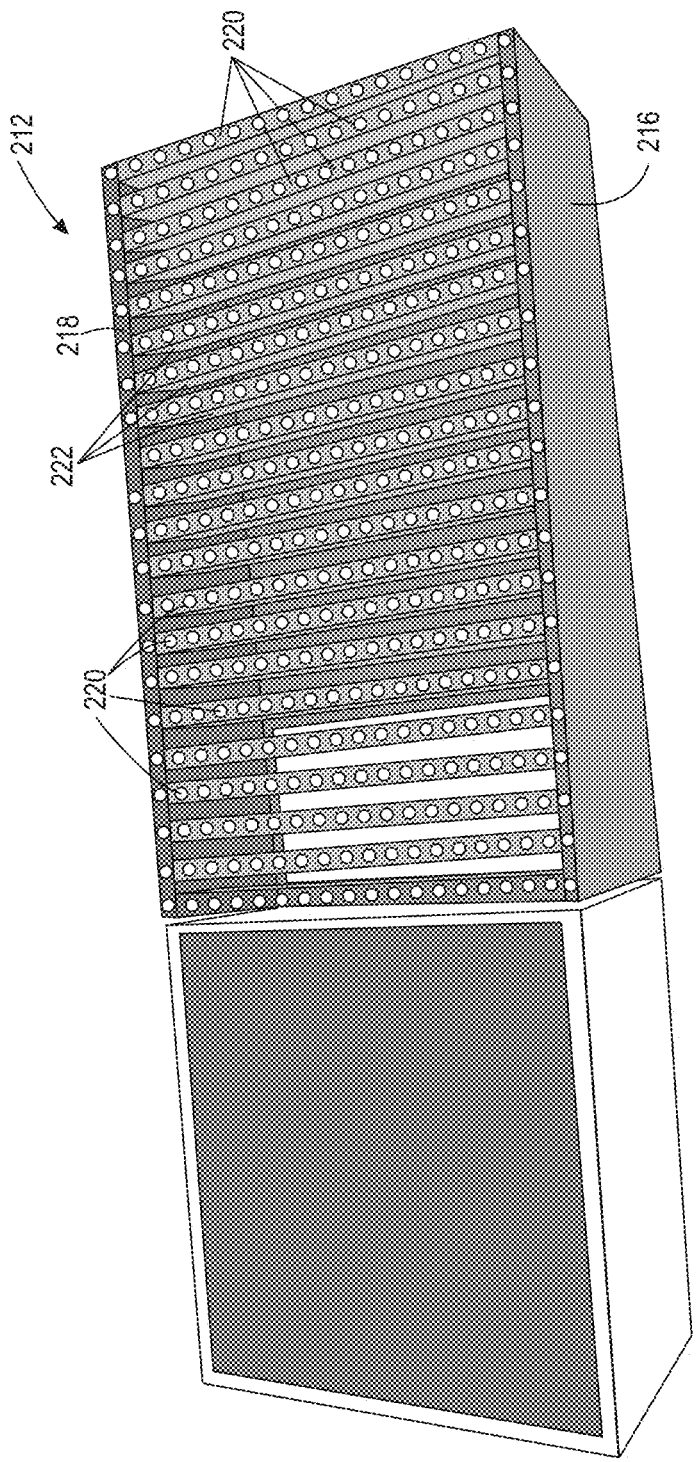
FIG. 3A is a top view of the foundation walls and pillars of a support structure that supports the overhang of the object shown in FIG. 2A during its construction.
Figure 3B:
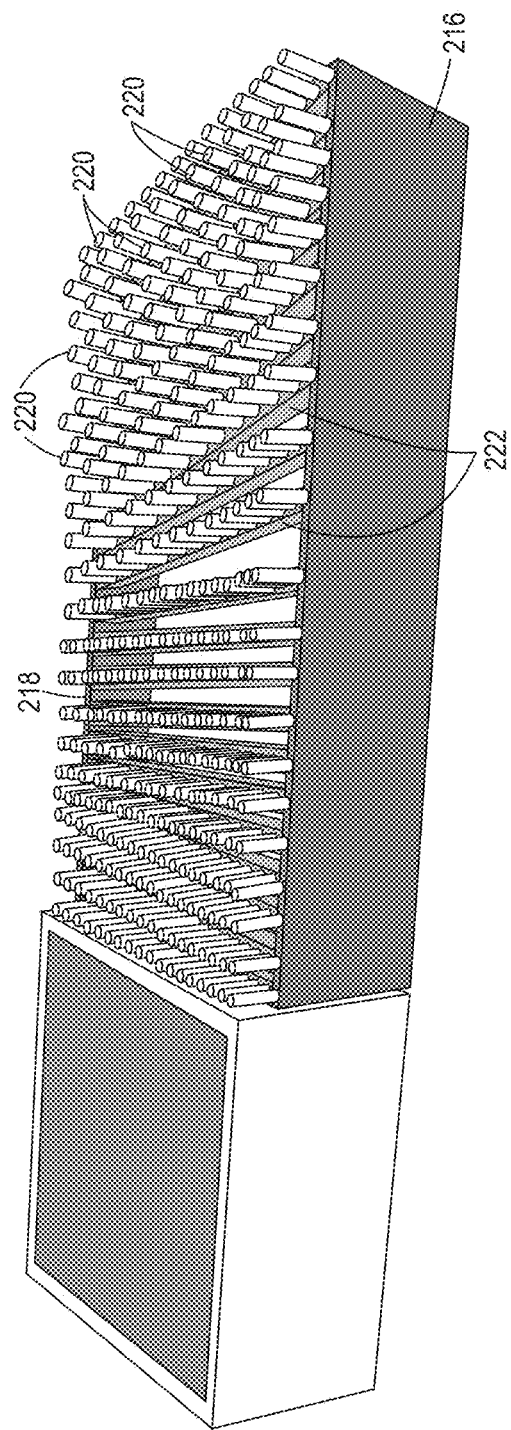
FIG. 3B is a side view of the foundation walls and pillars of a support structure that supports the overhang of the object shown in FIG. 2A during its construction.
Figure 3C:
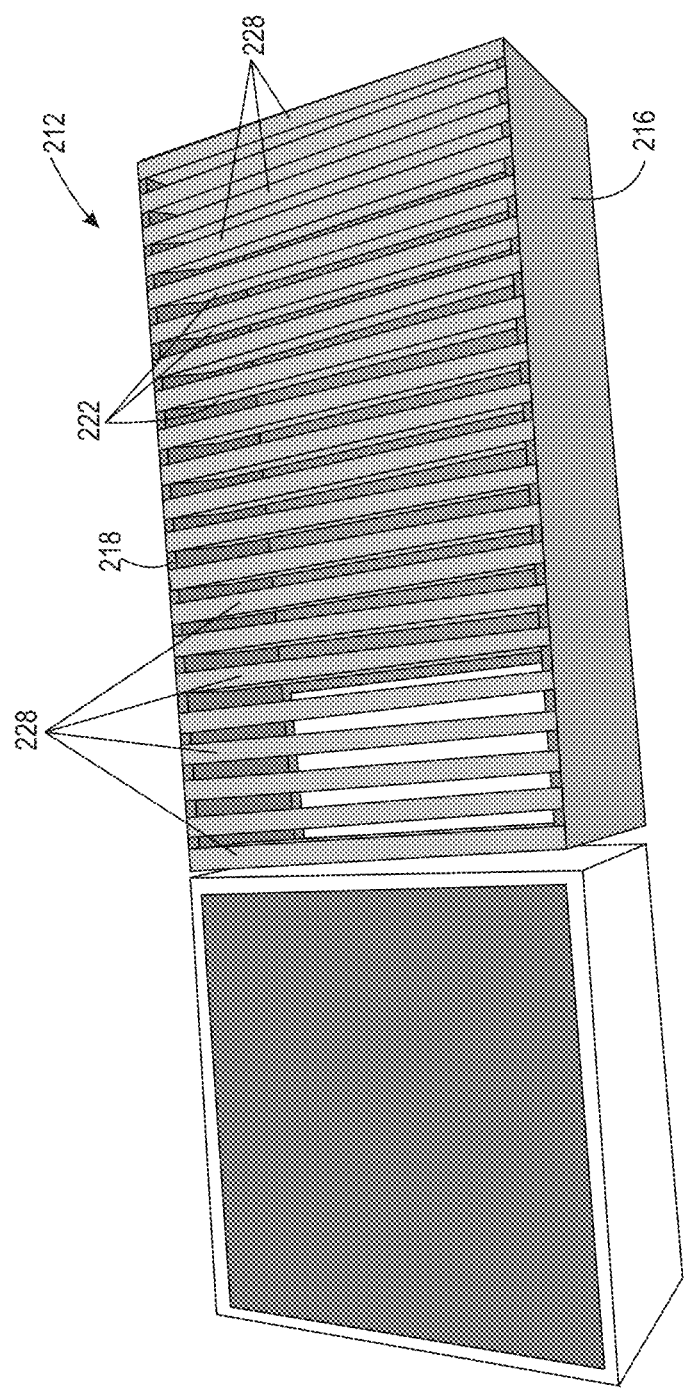
FIG. 3C is a perspective view of the continuous support lines formed over the pillars of FIG. 3A and FIG. 3B.
Figure 3D:
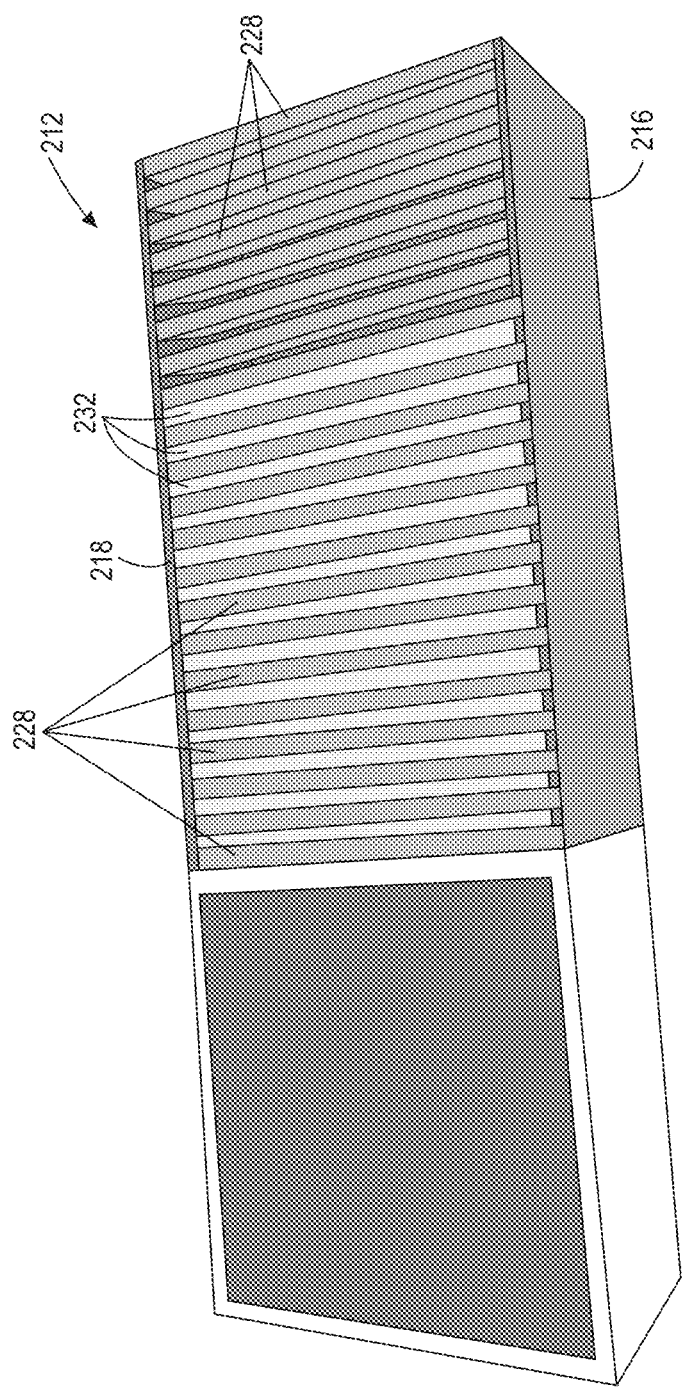
FIG. 3D is a perspective view of some of the continuous support lines of FIG. 3C being connected with support layer filler lines.
Figure 3E:
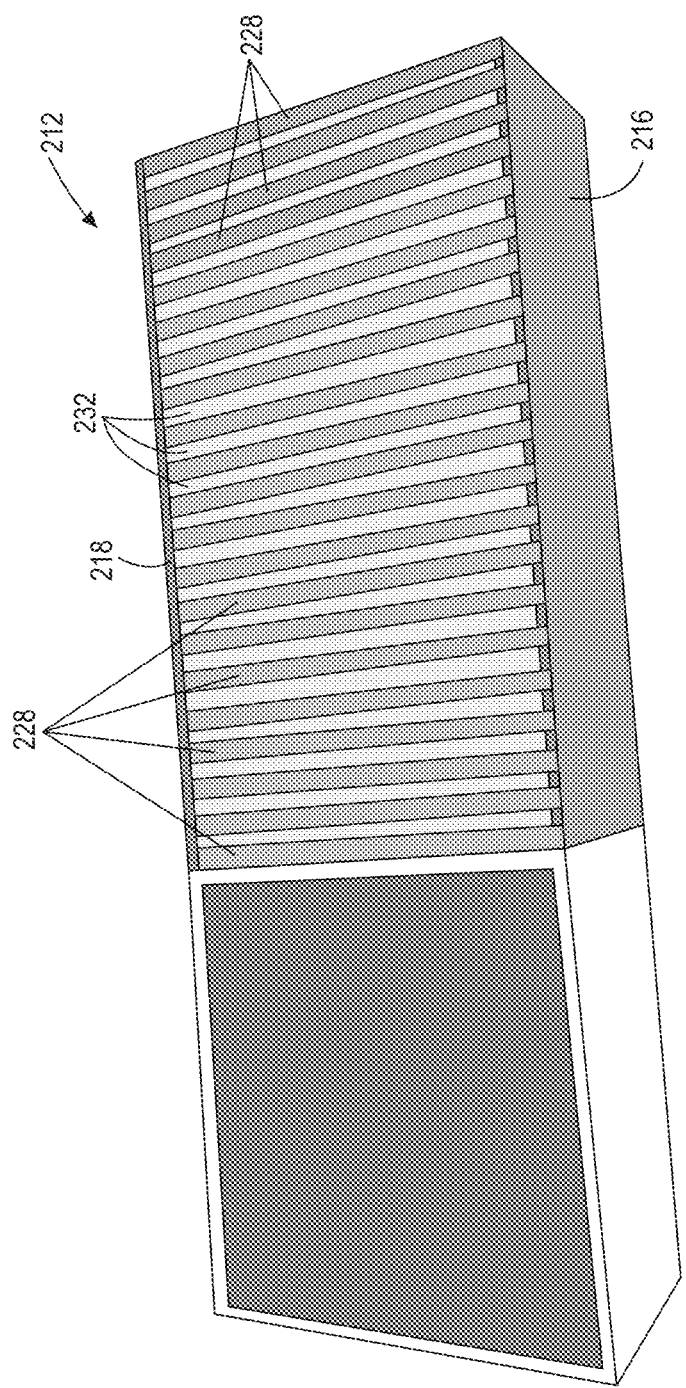
FIG. 3E is a perspective view of the support structure after all of the support layer filler lines have been formed.

The printer 100' of FIG. 1 includes a controller 148' that is configured to operate the ejector head 140 to construct the pillars 220 closer to one another on the foundational walls 222 and to form the continuous metal lines connecting the pillars in a single pass. As shown in FIG. 3A (top view) and FIG. 3B (perspective view) the front wall 216, the back wall 218, and the foundational walls are built in the known manner discussed above; however, the distance between adjacent pillars 220 is closer than previously known. In one embodiment, the distance is 0.85 mm. The pillars 220 are formed on the front wall 216, the back wall 218, and the foundational walls 222 as shown in FIG. 3A and FIG. 3B. Once the walls and pillars are formed in a known manner, the ejector head passes over each line of pillar tops that extends from the front wall 216 to the back wall 218 while ejecting melted metal drops in a single pass to form continuous metal lines 228 over the lines of pillars as shown in FIG. 3C. During this single pass, the ejector head is operated at a frequency of 300 Hz with a drop spacing of 0.2 mm to form the continuous metal lines 228 over each line of the pillars 220 between the front wall 216 and the back wall 218 in a single pass. The continuous metal lines 228 are separated by a spatial gap of about 1.75 mm. In a similar manner, the continuous metal lines 228 over the pillar tops are extended toward one another to fill in the gaps between the continuous metal lines 228 by forming continuous metal lines 232. Although the continuous metal lines 232 are formed with the same metal as continuous metal lines 228, they are shown in a different shade to distinguish them in this discussion. Continuous metal lines 232 slightly overlap the continuous metal lines 228 and are parallel to the continuous metal lines 228 over the pillars 220 on the walls. These continuous metal lines 232 are formed by the controller 148' operating the ejector head during a single pass at a 300 Hz ejection rate with a drop spacing of 0.28 mm. In one embodiment, the 1.75 mm distance between the continuous metal lines 228 is filled with seven continuous metal lines 232 as the width of the metal lines 232 is about 0.25 mm. In FIG. 3D, the left side of the structure has been completed as the gaps between adjacent continuous metal lines 228 have been filled with continuous metal lines 232. FIG. 3E shows the completed support structure 212. The spacing of the pillars on the walls, the distance between continuous lines 228, the drop spacing used to form the continuous metal lines 228 and 232, the width of the metal lines 232, and the ejection frequency of the ejector head during formation of the continuous metal lines 228 and 232 are parameters that are determined empirically.

The controller 148' can be implemented with one or more general or specialized programmable processors that execute programmed instructions. The instructions and data required to perform the programmed functions can be stored in memory associated with the processors or controllers. The processors, their memories, and interface circuitry configure the controllers to perform the operations previously described as well as those described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits. During metal object formation, image data for a structure to be produced are sent to the processor or processors for controller 148' from either a scanning system or an online or work station connection for processing and generation of the signals that operate the components of the printer 100' to form an object and the requisite support structures on the platform 112.

Figure 4:
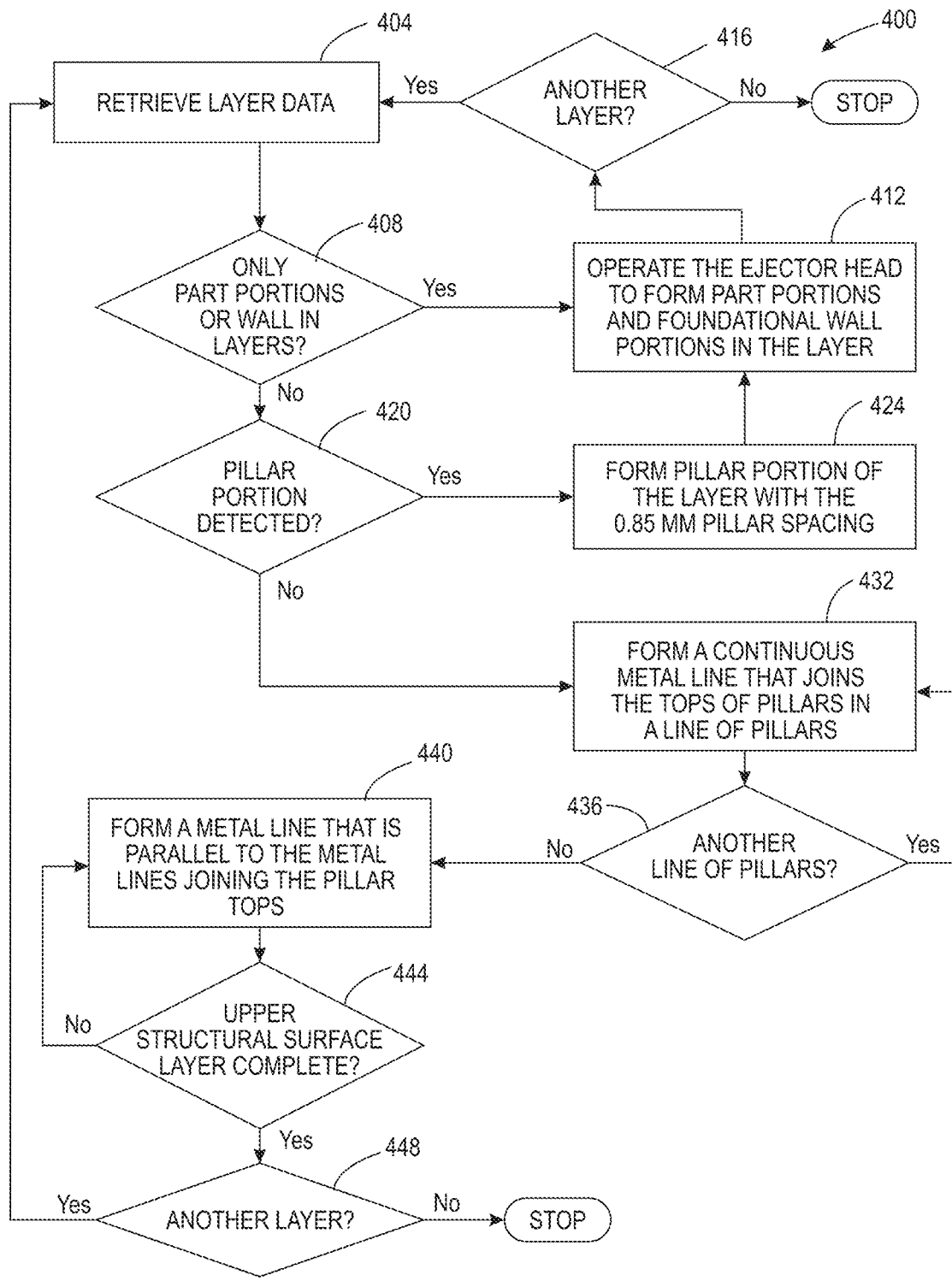
FIG. 4 is a flow diagram of a process for forming support structures with the printer of FIG. 1.

A process for operating the 3D metal object printer 100' to form continuous metal lines over pillars in metal support structures and to join the continuous metal lines to one another is shown in FIG. 4. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 148' noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the processing is described.

FIG. 4 is a flow diagram for a process 400 that operates the ejector to form continuous metal lines over pillars in metal support structures and to join the continuous metal lines to one another when the controller 148' executes programmed instructions stored in a non-transitory memory operatively connected to the controller to build metal support structures. The process begins by retrieving layer data (block 404). If the layer data contains only part portions and foundational wall portions (block 408), then the ejector head is operated to form the part portions and foundational wall portions of the layer (block 412). If another layer is available (block 416), then the layer data is retrieved (block 404).

Continuing with reference to FIG. 4, if the layer data includes a pillar portion of a support structure (block 420), then the controller operates the ejector head 140 to form the pillar portions in the known manner described above except they are separated from one another at a distance of about 0.85 mm (block 424). The part portions and any foundational wall portions are formed (block 412) and the process determines if another layer is available (block 416). The process stops if no other layer data is available. Otherwise, it retrieves the layer data (block 404). If the layer data contain more than part portions and foundational wall portions (block 408) and no pillar portions are in the layer data (block 420), then an upper surface for the support structure is formed in the layer and the ejector head 140 is operated at the 300 Hz frequency with a drop spacing of about 0.2 mm to form a continuous metal line that joins the tops of a line of pillars between the front wall and the back wall in a single pass (block 432). The tops of the pillars in each line of pillars are joined with a continuous metal line until all of the lines of pillars are joined (block 436). The process continues by operating the ejection head at a frequency of 300 Hz and a drop spacing of about 0.28 mm to form continuous metal lines that are parallel to the continuous metal lines that join the pillars on each wall (block 440) until the upper layer of the support structure is finished (block 444). Once the upper layer is complete, the process determines if layer data is available (block 448) and if layer data is available, the process continues (block 404). If no layer data is available, the process stops.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed is:

1. A metal drop ejecting apparatus comprising:
   an ejector head configured to eject melted metal drops through a nozzle;
   a planar member positioned to receive melted metal drops ejected from the ejector head; and
   a controller operatively connected to the ejector head, the controller being configured to:
   move the ejector head over the planar member and operate the ejector head at a first ejection frequency to form a first line of spatially separated pillars on the planar member with metal drops ejected from the ejector head, the pillars in the spatially separated pillars are separated from one another by a predetermined distance; and
   move the ejector head over the first line of spatially separated pillars and operate the ejector head at a second ejection frequency and a first drop spacing to eject melted metal drops that form a continuous metal line over the first line of spatially separated pillars in a single pass, the second ejection frequency being different than the first ejection frequency.

2. The apparatus of claim 1 wherein the predetermined distance is 0.85 mm.

3. The apparatus of claim 2 wherein the first ejection frequency is 100 Hz and the second ejection frequency is 300 Hz.

4. The apparatus of claim 3 wherein the first drop spacing is 0.2 mm.

5. The apparatus of claim 4, the controller being further configured to:
   move and operate the ejector head at a third ejection frequency to eject melted metal drops and form a second line of spatially separated pillars that is separated from and parallel to the first line of spatially separated pillars; and
   operate the ejector head at the frequency of 300 Hz and the drop spacing of 0.2 mm to eject melted metal drops and form a continuous metal line over the second line of spatially separated pillars in a single pass.

6. The apparatus of claim 5, the controller being further configured to:
   operate the ejector head to form a continuous metal line adjacent to the continuous metal line over the first line of spatially separated pillars to extend the continuous metal line over the first line of spatially separated pillars toward the continuous metal line over the second line of spatially separated pillars.

7. The apparatus of claim 6, the controller being further configured to:
   operate the ejector head to form the continuous metal line adjacent to the continuous metal line over the first line of spatially separated pillars in a single pass.

8. The apparatus of claim 7, the controller being further configured to:
   operate the ejector head at the ejection frequency of 300 Hz with a drop spacing of 0.28 mm to form the continuous metal line adjacent to the continuous metal line over the first line of spatially separated pillars.

\* \* \* \* \*